United States Patent [19]

Cross et al.

[11] 4,026,694

[45] May 31, 1977

[54] STABILIZED DISPERSIONS OF MICRONUTRIENTS IN SPRAY OILS

[75] Inventors: Edward A. Cross, Houston, Tex.; John D. Downer, Pointe-a-Pierre, Trinidad And Tobago

[73] Assignee: Texaco Inc., New York, N.Y.

[22] Filed: Apr. 23, 1976

[21] Appl. No.: 679,532

Related U.S. Application Data

[62] Division of Ser. No. 528,967, Dec. 2, 1974, Pat. No. 3,982,920.

[52] U.S. Cl. .................................. 71/11; 71/27; 71/64 C; 159/14
[51] Int. Cl.$^2$ .................................. C05F 11/00
[58] Field of Search .............. 71/1, 11, 27, 64 A, 71/64 R, 64 C; 260/439, 504, 514 N; 424/287, 288, 356; 252/38; 159/14

[56] References Cited

UNITED STATES PATENTS

| | | | |
|---|---|---|---|
| 2,392,119 | 1/1946 | Colbeth | 159/14 X |
| 3,216,480 | 11/1965 | Schilt | 159/14 X |
| 3,332,971 | 7/1967 | Elder et al. | 260/514 N X |
| 3,661,550 | 5/1972 | Downer et al. | 71/27 |

*Primary Examiner*—Frank A. Spear, Jr.
*Assistant Examiner*—Ferris H. Lander
*Attorney, Agent, or Firm*—Thomas H. Whaley; Carl G. Ries; Henry W. Archer

[57] ABSTRACT

Disclosed herein are self-emulsifiable compositions containing water soluble micronutrients such as inorganic salts of zinc or manganese in a finely divided form. The concentrates are prepared from inexpensive water soluble compounds by an emulsion dehydration process. The compositions containing horticultural mineral spray oils are capable of forming a stable emulsion with water by gentle shaking. Alternatively, the compositions may be diluted further with additional spray oils and remain as a suspension.

2 Claims, No Drawings

STABILIZED DISPERSIONS OF MICRONUTRIENTS IN SPRAY OILS

CROSS REFERENCE TO RELATED APPLICATION

This application is a divisional application of application Ser. No. 528,967, filed Dec. 2, 1974 and now U.S. Pat. No. 3,982,920, Sept. 28, 1976.

BACKGROUND OF THE INVENTION

1. Field of the Invention

This invention relates to improvements in compositions suitable for supplying micronutrients to growing plants by absorption through the leaves. More particularly the invention is concerned with spray oils which contain water soluble inorganic salts of the desired micronutrients dispersed in the oil by an emulsion dehydration process.

2. Description of the Prior Art

The art to which this invention relates is aware, inter alia, of the following U.S. Pat. Nos.: 2,865,956, 3,332,971 and 3,661,550. The compositions described in these patents contain metal salts of oil-soluble organic acids and more particularly salts of naphthenic acids. While such oil-soluble organic compounds generally perform effectively, they are rather expensive and sometimes phytotoxic.

SUMMARY OF THE INVENTION

The present invention consists in compositions of stable suspensions in mineral oils and containing about 0.05 to about 25 percent by weight of a water soluble inorganic micronutrient salt, about 0.5 to about 10 percent by weight of an emulsifying gent and the balance a horticultural spray oil. The compositions are prepared by a process which includes the steps of a making a stable emulsion of a water solution of the salt in the oil, the emulsion being stabilized by using a suitable emulsifying agent which also acts as a stabilizer in the finished slurry followed by dehydration of the emulsion to form a pumpable, stable slurry of finely divided salt in the oil. The composition may be diluted, as desired for application, with additional spray oil, thereby remaining as a suspension. Alternatively, it may be gently shaken with water to form a stable emulsion.

The inorganic salts found suitable for the compositions of the invention include:

| | |
|---|---|
| $ZnCl_2$ | Chloride |
| $Zn(ClO_3)_2 . 4H_2O$ | Chlorate |
| $ZnCr_2O_7 . 3H_2O$ | Dichromate |
| $Zn(HSO_2 . CH_2O)_2$ | Formaldehyde-sulfoxylate |
| $Zn(CHO_2)_2$ | Formate |
| $ZnC_3H_7O_6P$ | Glycerophosphate |
| $Zn(C_3H_5O_3)_2 . 3H_2O$ | Lactate |
| $Zn(MnO_4)_2 . 6H_2O$ | Permanganate |
| $Zn(NO_3)_2 . 3H_2O$ or $6 H_2O$ | Nitrate |
| $Zn(C_6H_5SO_4)_2 . 8H_2O$ | 1-phenol-4-sulfonate |
| $ZnSO_4$ | Sulfate |
| $Zn(SCN)_2$ | Thiocyanate |
| $Zn(C_5H_9O_2)_2 . 2H_2O$ | Valerate |
| $Mn(C_2H_3O_2) . 4H_2O$ | Acetate |
| $MnCl_2$ or $. 4H_2O$ | Chloride |
| $Mn(CHO_2)_2 . 2H 0$ | Formate |
| $Mn(C_3H_7O_6P)$ | (11) Glycerophosphate |
| $Mn(NO_3)_2 . 4H_2O$ | Nitrate |
| $Mn(C_3H_5O_3) . 3H_2O$ | Lactate |
| $Mn_2O_7$ or $MnO_3$ | Heptoxide or trioxide |
| $Mn_2(PO_3)_6 . 2H_2O$ | (111) Metaphosphate |

-continued

| | |
|---|---|
| $Mn(H_2PO_4)_2 . 2H_2O$ | (11) Orthophosphate |
| $Mn(H_2PO_2)_2 . H_2O$ | (11) Hypophosphite |
| $MnSO_4 . 4H_2O$ | Sulfate (several hydrates) |
| $Mn(SCN)_2 . 3H_2O$ | (11) Thiocyanate |
| $Mn(C_5H_9O_2)_2 . 2H_2O$ | Valerate |

The emulsifier should be compatible with the inorganic salt and relatively nonphytotoxic. Nonionic emulsifiers will be acceptable in general. Suitable emulsifier stabilizers include alkylarylpolyether alcohols having the general structural formula:

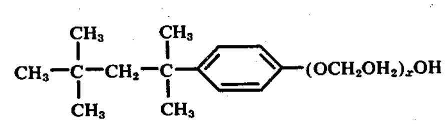

wherein $x$ represents the average number of ethylene oxide units in the ether side chain. Preferred among these are Triton X207 and X363. These products are described in greater detail in the brochures "The Nonionic Octylphenoxyethanol Series," and "Triton 207" published by the Rohm and Haas Company, Philadelphia, Pa.

The horticultural spray oils used here can be characterized as non-phytotoxic hydrocarbon mineral oils, the aromatic content thereof being below about 15 percent by weight, and having a boiling point range between about 600 to 775° F, with viscosity of between about 60 and 85 SUS (Saybolt Universal Seconds). Optimum results have been obtained with compositions in which the hydrocarbon solvent has a gravity API (American Petroleum Institute) of 27 to 35, an aromatics content below about 15 percent by weight, and a viscosity SUS (Saybolt Universal Seconds) at 100° F. of 70–104, preferable about 75 to 100 SSU. It will be noted by those skilled in this art that at least some of the oils encompassed by the above definitions have pesticidal, acaricidal; insecticidal, viricidal and/or fungicidal activities and that such properties are retained in the claimed compositions which contain such oils. Accordingly, these compositions have multiple effects.

The preferred oil is that marketed under the trademarked name of "Spraytex" and which analyses as shown below:

| | |
|---|---|
| R.S. No. | 1200/67 |
| Sp. Gravity at 88° F. | 0.8390 |
| at 60° F. | 0.8493 |
| ° API (American Petroleum Institute) Gravity | 35.1 |
| Flash Point COC (Cleveland Open Cup) ° F. | 395 |
| Viscosity Saybolt Universal Seconds/100° F. | 84.2 |
| Colour, Say./NPA (Saybolt/National Petroleum Association) | 0.5 |
| Pour Point, ° F. | 5 |
| Neutralization No. mg. KOH/g. | 0.04 |
| Distillation, ° F(ASTM D-447) Initial boiling point | 637 |
| 10% | 675 |
| 50% | 696 |
| 90% | 729 |
| Final boiling point | 745 |
| Aromatics | 10.7 |
| Ash, % wt. | 0.001 |
| Unsulfonatable Residue, % | 94.2 |

The composition may be prepared by an emulsion-dehydration technique using a Climbing Film Evaporator (CFE) or rising film evaporator. This apparatus is especially useful in concentrating mixtures such as emulsions which foam considerably on heating and is described in detail in Hausbrand, E., Evaporating Condensing and Cooling Apparatus, Fourth English Edition, pp 422–4., D. Van Nostrand Co. New York.

The CFE is essentially a distillation apparatus but instead of the conventional distillation flask, it consists of a long tube, heated by a steam-jacket. The charge enters at the bottom of the tube which is under reduced pressure, and ascends in the form of a thin film from which the more volatile component is flashed-off. The top of the tube connects to a cyclone in order to minimise entrainment of concentrated material in the volatile component. Concentrate and water-vapor are then cooled and collected in separate line systems. Feed to the evaporator is cotrolled by a D.C.L. micro pump (a diaphragm-type pump) and enters the CFE through a mercury leg which is necessary for the pump to operate satisfactorily into a vacuum. The output rate and the degree of concentration may be controlled by adjusting the operating pressure, the steam pressure, and the charge rate. The following is charged as an emulsion to the apparatus.

| Spraytex CT | - | 1200 g |
| Triton X207 | - | 60 g |
| Water | - | 740 g |
| Micronutrient salt | - | 24 to 240 grams |

The CFE used had a total internal volume of 131 ml.; the optimum range of operating conditions for this apparatus were found to be:

The operating pressure can be about 1–25 mm. Hg.
The steam pressure can be about 15–25 psig
The charge rate can be about 1–4 1/hr.

As the product tends to settle upon standing, it was considered necessary to develop a product stability test. In this test, a representative sample (250cc) of the product is agitated for 5 minutes using a Silverson Mixer/Emulsifier at its maximum speed setting. The agitated mixture is then placed in a measuring cylinder (250 cc) and aliquots (10 cc) are drawn every half-hour. The samples are taken from 20–25 cc below the surface and analysed for zinc or manganese content by atomic absorption spectroscopy.

The effect of varying the feed-rate into the reactor is shown in the explanatory data of Tables I and II. High feed-rates may be obtained, up to 3600 ml/hour (the total internal volume of the CFE tube is 131 ml.) but this is accompanied by an increase in the water-content of the product. However, this is not detrimental from the stability standpoint. In fact the higher water-content is to be preferred in terms of long term storage (See Table III). Thus the product from Run 8, containing 1% water settles rapidly within 5 hours, while the product from Run 5 with 0.5 water forms a cake after standing for one week, hand-shaking being then incapable of restoring its original composition. On the other hand Runs 6 and 7 with 3.7% and 4.8% water, respectively (Tables II and III), show no settling after 5 hours and no tendency towards caking; after standing for one week or more, the mixture is readily reconstituted by gentle shaking. A stable product containing as much as 4.5% zinc has been prepared (Run II, Table II) with a water-content of 5.5%.

Table IV illustrates the effect of the anionic species of the zinc salt. The salts studied are the sulphate (Table II), the acetate and the chloride. The sulphate and the acetate both form stable concentrates (Table V) unlike the chloride which is unstable. Three Runs (20, 21 and 23) have been carried out using Triton X114 (Rohm & Haas alkyl phenoxy polyethoxy ethanol) as the emulsifier in place of Triton X207 alkyl aryl polyether alcohol + non-ionic solubilizer) which was used in the other runs. Visual inspection shows that Triton X114 results in less stable products than Triton X207.

The explanatory data of Table VI seeks to determine whether the conditions under which the emulsion was concentrated would cause the micronutrient salt to lose its water of crytalization. Hydrated zinc sulphate and acetate crystals were first analysed for water content by the Dean and Stark method using benzene as the solvent. The results showed that the zinc sulphate heptahydrate dehydrated to the monohydrate as shown by the following equation:

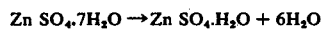

$$Zn\ SO_4 \cdot 7H_2O \rightarrow Zn\ SO_4 \cdot H_2O + 6H_2O$$

On the other hand zinc acetate dihydrate loses both molecules of water of crystallisation, as follows:

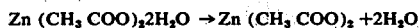

$$Zn\ (CH_3\ COO)_2 \cdot 2H_2O \rightarrow Zn\ (CH_3\ COO)_2 + 2H_2O$$

Salt samples taken from the CFE products were then analysed for water content by the same method of analysis (Dean & Stark). The results showed the same water-contents for the CFE samples and fresh hydrated zinc sulphate and acetate crystals. Thus it may be concluded that both salts are present in the CFE products in the fully hydrated state. Table VII examines further the state of the salt and distribution of water in the product. It may be seen that the products contained water not only in the form of water of crystallisation but also in the free state. Regarding the state of the micronutrient salt, this would be mostly as insoluble matter since the free water in the system would be incapable of solubilising the total salt content.

The above data shows that zinc and managenese salts may be dispersed satisfactorily in spray oils. Although the products settle within a few hours, they are readily constituted by gentle hand-shaking. The dispersions containing up to 4.5% metal may be diluted either with water to form an emulsion or with additional spray oils.

It was found that under the conditions used for the emulsion dehydration, the micronutrient salt was left in its fully hydrated form and there was also some free water.

TABLE I

| DISPERSION OF ZINC SULPHATE IN SPRAYTEX: INITIAL RUN USING CLIMBING FILM EVAPORATOR | | | | |
|---|---|---|---|---|
| Run No. | 1 | 2 | 3 | 4 |
| Reaction Conditions[a] | | | | |
| Pressure, mm. Hg. | 4–6 | 5–7 | 15 | 15 |
| Col. Heat (Variac setting) | 90 | 125 | 135 | 135 |
| Steam Pressure p.s.i.g. | 20 | 20 | 15 | 24 |
| Top Temp. ° C. | 92 | 80 | 90 | 90–100 |
| Emulsion feed rate, ml/hr. | 960 | 1500 | 1500 | 3500 |
| Product Recovery [b] | | | | |
| H$_2$O phase, ml. | 320 | 380 | 315 | 240 |
| Oil phase, ml. | 640 | 755 | 550 | 550 |
| Product Analysis | | | | |
| % water in oil phase | 0.5 | 1.5 | 0.2 | 1.0 |
| % Zn in oil phase | 0.37 | 0.40 | — | — |

TABLE I-continued

DISPERSION OF ZINC SULPHATE IN SPRAYTEX: INITIAL RUN USING CLIMBING FILM EVAPORATOR

| Run No. | 1 | 2 | 3 | 4 |
|---|---|---|---|---|
| Actual Zn in oil × 100 / Theroet. Zn in oil | 82 | 89 | — | — |

[a] The composition of the charge is as described for Table IV but using only 24g of salt and Triton X207 emulsifier.
[b] The CFE was operated only as long as was necessary to obtain a representative sample of the product; the recovery is therefore unrelated to the total charge prepared.

TABLE II

PREPARATION OF DISPERSION OF ZINC AND MANGANESE SALTS IN SPRAYTEX

| Run No. | 5 | 6 | 7 | 8 | 11 | 11 | 13 |
|---|---|---|---|---|---|---|---|
| Reaction Conditions[a] | | | | | | | |
| Pressure, mm. Hg. | 15 | 9 | 9 | 5 | 11 | 4 | 2 |
| Co. Heat (Variac Setting) | 110 | 110 | 110 | 110 | Max | Max | Max |
| Steam Pressure, p.s.i.g. | 20 | 22 | 20 | 22 | 20 | 20 | 21 |
| Top Temp. °C | 109 | 78 | 62 | 104 | 68 | 67 | 68 |
| Emulsion Feed Rate ml/hr. | 1060 | 2300 | 3600 | 750 | 2200 | 2200 | 2200 |
| Product Recovery[b] | | | | | | | |
| $H_2O$ Phase mls. | 265 | 230 | 270 | 180 | 585 | 560 | 585 |
| Oil Phase mls. | 430 | 582 | 840 | 485 | 1400 | 1550 | 1540 |
| Product Analysis | | | | | | | |
| % water in[c] oil phase | 0.5 | 3.7 | 4.8 | 1.0 | 5.5 | 6.5 | 4.0 |
| gm. Zn or Mn in formulation | 5.9 | 5.9 | 5.9 | 5.9 | 54 | 27 | 13.5 |
| % Zn or Mn in oil phase | 0.61 | 0.68 | 0.63 | — | — | — | — |
| Theoretical % Zn or Mn in oil phase | 0.49 | 0.49 | 0.49 | 0.49 | 4.5 | 2.3 | 1.1 |
| Zn/Mn Salt In formulation | Mn Sulphate | Mn Sulphate | Mn Sulphate | Mn Sulphate | Zn Sulphate | Zn Sulphate | Zn Sulphate |

[a] Composition of charge as in Table I except for micronutrient
[b] Same as footnote (b) Table I
[c] Determined by Dean and Stark (benzene)

TABLE III

STABILITY OF MANGANESE SULPHATE DISPERSION IN SPRAYTEX

| Run No. Time (hr.) | 5 | 6 | 7 | 5[a] | 7[a] | 8 |
|---|---|---|---|---|---|---|
| | % Mn in Oil Phase | | | | | |
| 0 | 0.59 | 0.70 | 0.62 | 0.42 | 0.66 | 0.42 |
| ½ | 0.62 | 0.70 | 0.64 | 0.42 | 0.69 | 0.26 |
| 1 | 0.66 | 0.62 | 0.59 | 0.41 | 0.69 | 0.21 |
| 1½ | 0.57 | 0.67 | 0.63 | 0.41 | 0.68 | 0.17 |
| 2 | 0.62 | 0.62 | 0.65 | 0.41 | 0.65 | 0.10 |
| 2½ | 0.55 | 0.61 | 0.63 | 0.39 | 0.70 | 0.16 |
| 3 | 0.64 | 0.61 | 0.61 | 0.39 | 0.68 | 0.15 |
| 3½ | 0.65 | 0.56 | 0.61 | 0.41 | 0.72 | 0.14 |
| 4 | 0.62 | 0.60 | 0.62 | 0.41 | 0.64 | 0.12 |
| 4½ | 0.62 | 0.55 | 0.62 | 0.42 | 0.62 | 0.09 |
| 5 | 0.61 | 0.52 | 0.56 | 0.39 | 0.68 | 0.10 |

[a] After standing for one week, these samples (Runs 5 and 7) were re-suspended by hand-shaking; stability tests were then carried out in the usual manner.

TABLE IV

PREPARATION OF DISPERSIONS OF ZINC SALTS IN SPRAYTEX

| Run No. | 15 | 16 | 17 | 18 | 20[a] | 21[a] | 23[a] |
|---|---|---|---|---|---|---|---|
| Zn salt in formulation[b], type, weight, g. | Acetate 24 | Chloride 60 | Chloride 24 | Chloride 24 | Acetate 60 | Acetate 120 | Acetate 24 |
| Reaction Conditions | | | | | | | |
| Pressure, mm.Hg. | 3 | 4 | 4 | 4 | 5 | 6 | 5 |
| Col. Heat | Max. | Max. | Max. | Max. | Max. | Max. | Max. |
| (Variac setting) | | | | | | | |
| Steam, Pressure, psig. | 20 | 20 | 20 | 20 | 20 | 20 | 20 |
| Top Temp., °C. | 82 | 66 | 68 | 85 | 68 | 76 | 77 |
| Emulsion Feed Rate, ml./hr. | 1350 | 2300 | 2300 | 1350 | 2400 | 2400 | 1350 |
| Product Recovery | 485 | 435 | 520 | 390 | 500 | 560 | 485 |
| $H_2O$ Phase, ml. | | | | | | | |
| Oil Phase, ml. | 1320 | 1390 | 1610 | 1060 | 1395 | 1555 | 1360 |
| Product Analysis | | | | | | | |
| % water in oil phase[c] | 3.2 | 9.0 | 6.5 | 3.6 | 4.0 | 4.9 | 3.0 |

[a] Runs 20, 21 and 23 used Triton X114 as emulsifier and not Triton X207 as in all previous runs.
[b] Formulation of emulsion charged to the climbing film evaporator: 1200 gms. Spraytex; 740 gms. water 60 gms. emulsifier 24 to 240 gms. zinc salt
[c] Determined by Dean and Stark (benzene)

TABLE V

STABILITY OF ZINC SALT DISPERSIONS IN SPRAYTEX

| Run No. Time (hrs.) | 9 | 15 | 11 | 12 | 23 | 16 | 18 |
|---|---|---|---|---|---|---|---|
| | % Zn in Oil Phase | | | | | | |
| 0 | 0.55 | 0.49 | 2.3 | 1.7 | 0.90 | 1.6 | 0.67 |
| ½ | 0.52 | 0.49 | 2.5 | 1.9 | 0.86 | 1.9 | 0.63 |
| 1 | 0.53 | 0.57 | 1.7 | 1.9 | 0.74 | 0.06 | 0.73 |
| 1½ | 0.51 | 0.49 | 1.6 | 2.0 | 0.79 | 0.04 | 0.08 |
| 2 | 0.45 | 0.53 | 1.9 | 1.8 | 0.82 | 0.04 | 0.06 |
| 2½ | 0.46 | 0.52 | 1.2 | 2.0 | 0.77 | | |
| 3 | 0.46 | 0.49 | 2.4 | 1.7 | 0.86 | | |
| 3½ | 0.45 | 0.51 | 0.6 | 1.6 | 0.88 | | |
| 4 | 0.44 | 0.35 | 2.3 | 1.1 | 0.82 | | |
| 4½ | 0.43 | 0.53 | 0.9 | 1.7 | 0.75 | | |
| 5 | — | 0.51 | 2.7 | 1.0 | 0.81 | | |

| Zn salt in formulation | Ace-[a] tate | Acetate | Sulphate | Sulphate | Sulphate | Chloride | Chloride |

TABLE V-continued

| STABILITY OF ZINC SALT DISPERSIONS IN SPRAYTEX | | | | | | | |
|---|---|---|---|---|---|---|---|
| | % Za in Oil Phase | | | | | | |
| Run No. Time (hrs.) | 9 | 15 | 11 | 12 | 23 | 16 | 18 |
| type wt. mgs. | 24 | 24 | 240 | 120 | 60 | 60 | 24 |

[(a)] Formulation of emulsion charge to the climbing film evaporator
1200 gms. Spraytex
740 gms. water
60 gms. Triton X207
24 to 240 gms. Zinc salt
except for run 23 (See Table IV)

TABLE VI

| WATER OF CRYSTALLIZATION IN MICRONUTRIENTS SALTS | | | |
|---|---|---|---|
| Sample | % $H_2O$, Calc'd | % $H_2O$ Dean & Stark | Observations |
| Fresh $ZnSO_4 7H_2O$ | 37.5 - basis monohydrate 44 - basis anhydrous | 38 | Under conditions of Dean & Stark test the heptahydrate dehydrates to the monohydrate |
| Zinc Sulphate ex Run 11 | — | 38 | Salt is present in the micronutrient Spraytex concentrate as the heptahydrate |
| Fresh $Zn(CH_3COO)_2$ 2 $H_2O$ | 16.5 - basis anhydrous | 16 | Under conditions of Dean & Stark test the dihydrate dehydrates completely |
| Zinc Acetate ex Run 21 | — | 17 | Salt is present in the micronutrient Spraytex concentrate as the dehydrate |

TABLE VII

| SOLID SALT CONTENT AND %-FREE WATER OF MICRONUTRIENT SPRAYTEX CONCENTRATES | | | | | | |
|---|---|---|---|---|---|---|
| Run No. | 2 | 11 | 12 | 13 | 9 | 15 |
| Salt (Micronutrient) | ← $ZnSO_4 \cdot 7H_2O$ → | | | ← $Zn(CH_3COO)_2 \cdot H_2O$ | | |
| Theoretical gms. salt per 100 cc. Spraytex concentrate | 2 | 20 | 10 | 5 | 2 | 2 |
| Measured gms. salt per 100 cc. Spraytex concentrate | 1.8 | 11.3 | 8.5 | 3.9 | 1.6 | 1.8 |
| % salt in concentrate (basis theoretical) | 90 | 57 | 85 | 78 | 80 | 90 |
| % water in Spraytex concentrate | 1.6 | 5.5 | 6.5 | 4.0 | 0.5 | 3.2 |
| % water ex water | | | | | | |

TABLE VII-continued

| SOLID SALT CONTENT AND %-FREE WATER OF MICRONUTRIENT SPRAYTEX CONCENTRATES | | | | | | |
|---|---|---|---|---|---|---|
| Run No. | 2 | 11 | 12 | 13 | 9 | 15 |
| of crystallization | 0.7 | 4.3 | 3.2 | 1.5 | 0.3 | 0.3 |
| %-free water | 0.9 | 1.2 | 3.3 | 2.5 | 0.2 | 2.9 |
| Gms. of salt, free water can solubilize | 0.9 | 1.2 | 3.2 | 2.4 | 0.06 | 1.0 |
| gms. Insoluble salt | 0.9 | 10.1 | 5.3 | 1.5 | 1.5 | 0.8 |

The present compositions can be applied to the leaves, branches or barks of plants by means of knapsack mistblowers and heavy portable sprayers. As required by the terrain, there may be used instead fixed winged airplanes or helicopters equipped with Micronair rotary atomizer manufactured by Britten-Norman, Ltd., England) or boom type sprayers. Naturally, better distribution of the oil and lower cost of application are obtained by air spraying. The application rate of the composition may range from about 0.5 to 20 gallons per acre whether the composition is applied by air or by ground spraying. The amount of oil remaining on the plants can vary greatly according to the type of sprayer and the properties of the oil used. With an air pressure sprayer adjusted to a given discharge rate, the weight of the deposit will vary inversely with the viscosity of the oils used. In low volume sprayers, a reduction in viscosity means a greater rate of discharge or an increase in droplet size and either may give poor distribution of spray. The objective of the application is to spray the minimum quantity of the oil composition over the entire surface of the leaf, branch or bark. A suitable droplet size is of about 80 microns but this size can be within the range of 50 to 100 microns. A desirable density is one of about 32 droplets per $cm^2$. Spraying is preferably done in the early morning hours when the weather is calm in order to minimize drifting of the oil spray.

Substantially similar results are obtained with salts of molybdenum, calcium, magnesium and iron.

What is claimed is:

1. Process for preparing a micronutrient composition comprising forming a dispersed charge comprising a non-phytotoxic horticultural spray oil, an emulsifier, water an inorganic micronutrient salt of calcium, copper, molybdenum, manganese, zinc, magnesium, or iron and feeding said charge under reduced pressure to the inner tube of climbing film evaporator surrounded by a jacket containing pressurized steam, boiling off the water from said charge from the top of said inner tube and collecting a product consisting of a slurry of said micronutrient salt containing said oil and said emulsifier.

2. The process of claim 1 wherein said reduced pressure ranges from 1 to 25 mm of mercury, the steam pressure ranges from 15 to 25 psig and said charge is fed at an LHSV of about 5 to 30.

* * * * *